(12) United States Patent
Breton et al.

(10) Patent No.: US 7,138,187 B2
(45) Date of Patent: Nov. 21, 2006

(54) POLYVINYL ALCOHOL-BASED FILM EXHIBITING IMPROVED ADHESION

(75) Inventors: Robert A. Breton, San Pedro, CA (US); David M. Ambler, Rancho Palos Verdes, CA (US)

(73) Assignee: Younger Mfg. Co., Torrance, CA (US)

( * ) Notice: Subject to any disclaimer, the term of this patent is extended or adjusted under 35 U.S.C. 154(b) by 286 days.

(21) Appl. No.: 10/805,449

(22) Filed: Mar. 19, 2004

(65) Prior Publication Data

US 2005/0208316 A1 Sep. 22, 2005

(51) Int. Cl.
B32B 27/30 (2006.01)

(52) U.S. Cl. .................. 428/522; 427/255.39

(58) Field of Classification Search .......... 427/255.39, 427/490, 535; 428/500, 522
See application file for complete search history.

(56) References Cited

U.S. PATENT DOCUMENTS

| | | | | |
|---|---|---|---|---|
| 2,237,567 A | 4/1941 | Land | ............................. | 88/65 |
| 4,292,370 A | 9/1981 | Pekko | ......................... | 428/355 |
| 4,293,585 A | 10/1981 | Imada et al. | .................. | 427/40 |
| 4,691,662 A | 9/1987 | Roppel et al. | ............. | 118/50.1 |
| 4,791,303 A | 12/1988 | Wyslotsky | ................ | 250/492.1 |
| 4,818,624 A | 4/1989 | Downey, Jr. | ................ | 428/447 |
| 4,992,218 A | 2/1991 | Sugio et al. | .................. | 264/1.3 |
| 5,051,309 A | 9/1991 | Kawaki et al. | ............. | 428/332 |
| 5,071,906 A | 12/1991 | Tanaka et al. | .............. | 524/557 |
| 5,326,584 A | 7/1994 | Kamel et al. | ................ | 427/491 |
| 5,626,910 A * | 5/1997 | Tanabe et al. | ......... | 427/255.26 |
| 5,670,092 A | 9/1997 | Starzewski | .................... | 252/585 |
| 5,780,359 A | 7/1998 | Brown et al. | ................ | 438/659 |
| 5,876,753 A | 3/1999 | Timmons et al. | ........... | 427/488 |
| 5,928,527 A | 7/1999 | Li et al. | ........................ | 216/67 |
| 6,220,703 B1 | 4/2001 | Evans et al. | ................. | 351/163 |
| 6,235,396 B1 | 5/2001 | Dixon | ......................... | 428/412 |
| 6,339,206 B1 | 1/2002 | Johnson | ................. | 219/121.43 |
| 6,413,641 B1 | 7/2002 | Yamasaki et al. | ........... | 428/412 |
| 6,431,112 B1 | 8/2002 | Sill et al. | .................. | 118/723 E |
| 6,512,562 B1 | 1/2003 | Kobayashi et al. | .......... | 349/122 |
| 6,521,300 B1 | 2/2003 | Hsieh et al. | ................. | 427/539 |
| 6,583,929 B1 | 6/2003 | Hayashi | ....................... | 359/491 |
| 6,632,324 B1 | 10/2003 | Chan | ...................... | 156/345.48 |
| 6,939,612 B1 * | 9/2005 | Reyntjens | .................... | 428/437 |

* cited by examiner

*Primary Examiner*—D. S. Nakarani
(74) *Attorney, Agent, or Firm*—Sheppard, Mullin, Richter & Hampton LLP

(57) ABSTRACT

Modifications to the surface of polyvinyl alcohol-based films are disclosed that result in improved adhesion to optical materials. Specifically, the surface chemistry of the polyvinyl alcohol-based film is altered to include fluorine bonds, which surprisingly improve direct adhesion of the film to materials such as optical thermoset resins, without the use of additional coatings or multilayer sandwich construction. Embodiments of this invention for incorporation of polarizer films in thermoset resin lenses are described. A method of exposing the film to indirect, reduced-pressure plasma to achieve these surface modifications, and an exemplary holder for the film during such processing, are disclosed.

14 Claims, 4 Drawing Sheets

POLYVINYL ALCOHOL-BASED FILM EXHIBITING IMPROVED ADHESION

BACKGROUND OF THE INVENTION

This invention relates generally to optical films and, more particularly, to polyvinyl alcohol-based films exhibiting improved adhesion to an underlying substrate.

Polarized sunwear, visors, goggles, and window panes are designed to selectively absorb or reflect away horizontally polarized light. They are effective in reducing the polarized glare that can interfere with vision. Such glare is particularly noticeable when reflections occur from expansive flat surfaces such as water or roadways, but also can be a significant problem under hazy conditions such as smoggy or foggy skies. Polarizers offer a unique advantage for improved vision.

Many of the polarizers used in optical devices include polyvinyl alcohol-based films, which have been known and developed over the past 60 years, as evidenced by the considerable patent history including among others, U.S. Pat. Nos. 2,237,567, 4,992,218, 5,071,906, 5,670,092, and 6,583,929 B2. Polyvinyl alcohol-based films can be formulated to have excellent polarizing properties. However, the chemical and physical properties of polyvinyl alcohol-based films remain a challenge for research and development. These films typically are quite thin (less than 100 micrometers thick), and they are easily deformed or ripped in handling. In addition, the base film material and/or the polarizing agents added to it might be sensitive to heat, humidity, photobleaching, or other environmental exposures.

To avoid the risk of degradation from such environmental influences, polyvinyl alcohol polarizing films typically are encapsulated in lenses or window panes. Even then, such films might be susceptible to damage during the process of forming the optical device. For example, the heat of a thermoplastic molding process might degrade the film's polarizing efficiency. Additional challenges are encountered in thermoset lens casting: the fragile and easily displaced film must be protected while evenly delivering and reactively solidifying liquid-phase thermoset material around the polarizer, and care must be taken to ensure that there is adequate adhesion between the polarizer and the thermoset polymer to withstand any subsequent lens processing.

The issue of film adhesion is important, because polyvinyl alcohol polarizing films typically are not intrinsically reactive to further bonding with most desired optical polymer systems. Therefore, the film needs to be changed, treated, or otherwise processed to facilitate reliable adhesion. Various methods have address this need. U.S. Pat. Nos. 4,818,624 and 6,235,396 B1, for example, discuss coatings that can be applied to the polarizing film, for either improved stability to heat and moisture or improved adhesion within standard hard resin thermoset polymers. Such approaches can be successful, but additional coatings entail additional processing steps, with increased cycle time, costs, and possible losses from contamination or process variables. Consequently, alternative approaches are needed.

Another approach is to sandwich the polarizing film between additional, protective polymer layers adhesively bonded to the polarizer. These protective layers can be treated for improved adhesion to the adhesive layers or to subsequent lens materials. This approach is described, for example, in U.S. Pat. Nos. 5,051,309, 6,512,562 B1, and 4,292,370. Again, additional process steps are required to sandwich the film, and final optical properties might be downgraded due to different refractive indices, coefficients of thermal expansion, or other chemical or physical properties of the sandwiching layers and the applied adhesives. In addition, care still must be taken to ensure good adhesion during subsequent processing, such as grinding, edging, or coating a lens. This will be a particular concern with the multi-layer sandwich approach, because there are more discrete layers (typically at least five layers: protective layer/adhesive/polyvinyl alcohol-based polarizer/adhesive/protective layer) that may offer weak interfaces susceptible to delamination. Moreover, because of the added thickness of the sandwich construct, the overall thickness of the final lens might be larger than is cosmetically desirable.

Surface modification via chemical or physical changes of the polyvinyl alcohol-based film can afford an alternative and beneficial approach to enhanced subsequent adhesion. Such surface modifications often are encountered in other disciplines, for other types of materials, such as silicon wafer pre-treatments for semiconductor processing, or treatments with silicon- or fluorine-based organochemistry to create hydrophobic or anti-stick surfaces. U.S. Pat. Nos. 6,220,703 B1 and 6,413,641 B1 describe surface treatments and specific surface modifications of polarizing films comprising polyethylene terephthalate that lead to improved adhesion. However, given the distinct differences in chemical and physical properties between polyvinyl alcohol and these other materials, it is likely that different treatments will be required to achieve improved adhesion to polyvinyl alcohol-based films.

It should, therefore, be appreciated that there remains a need for, improved methods to enhance adhesion of polyvinyl alcohol-based polarizers in optical constructs. Particularly useful would be methods that reduce the number of process steps, or cycle time of production. The present invention fulfills these needs and provides further advantages.

SUMMARY OF THE INVENTION

The present invention resides in an improved polyvinyl alcohol-based film, e.g., a polarizing film, and related methods for making it, wherein a surface of the film comprises fluorine, to provide improved adhesion in optical constructs. The fluorine content preferably has a concentration of less than about 14 atomic %, and is bonded as C—F species on the film surface, adjacent to non-fluorinated species. The film has an oxygen-to-carbon ratio on the surface of the film that preferably is greater than 0.5:1, but not greater than approximately 1:1.

In another aspect of the invention, the surface of the polyvinyl alcohol-based film is treated by exposing it to an indirect, reduced-pressure plasma, comprising fluorine-containing gas, preferably $CF_4$. In addition, the plasma can further comprise an oxygen-containing gas and optionally an inert gas such as argon.

In yet another aspect of the invention, the surface of the polyvinyl alcohol-based film is treated by placing the film in contact with an rf electrode, and then exposing the film to an indirect, reduced-pressure rf plasma. The plasma can comprise fluorine-containing gas and, optionally, oxygen-containing gas. In addition, the step of placing the film in contact with an rf electrode can comprises mounting the film in an electrically conductive rack, preferably a rack having non-rounded edges. This is believed to create weak secondary plasma zones in proximity to the film.

Other features and advantages of the present invention should become apparent from the following description of the preferred embodiments, taken in conjunction with the accompanying drawings, which illustrate, by way of example, the principles of the invention.

DETAILED DESCRIPTION OF THE PREFERRED EMBODIMENTS AND METHODS

Figure 1:
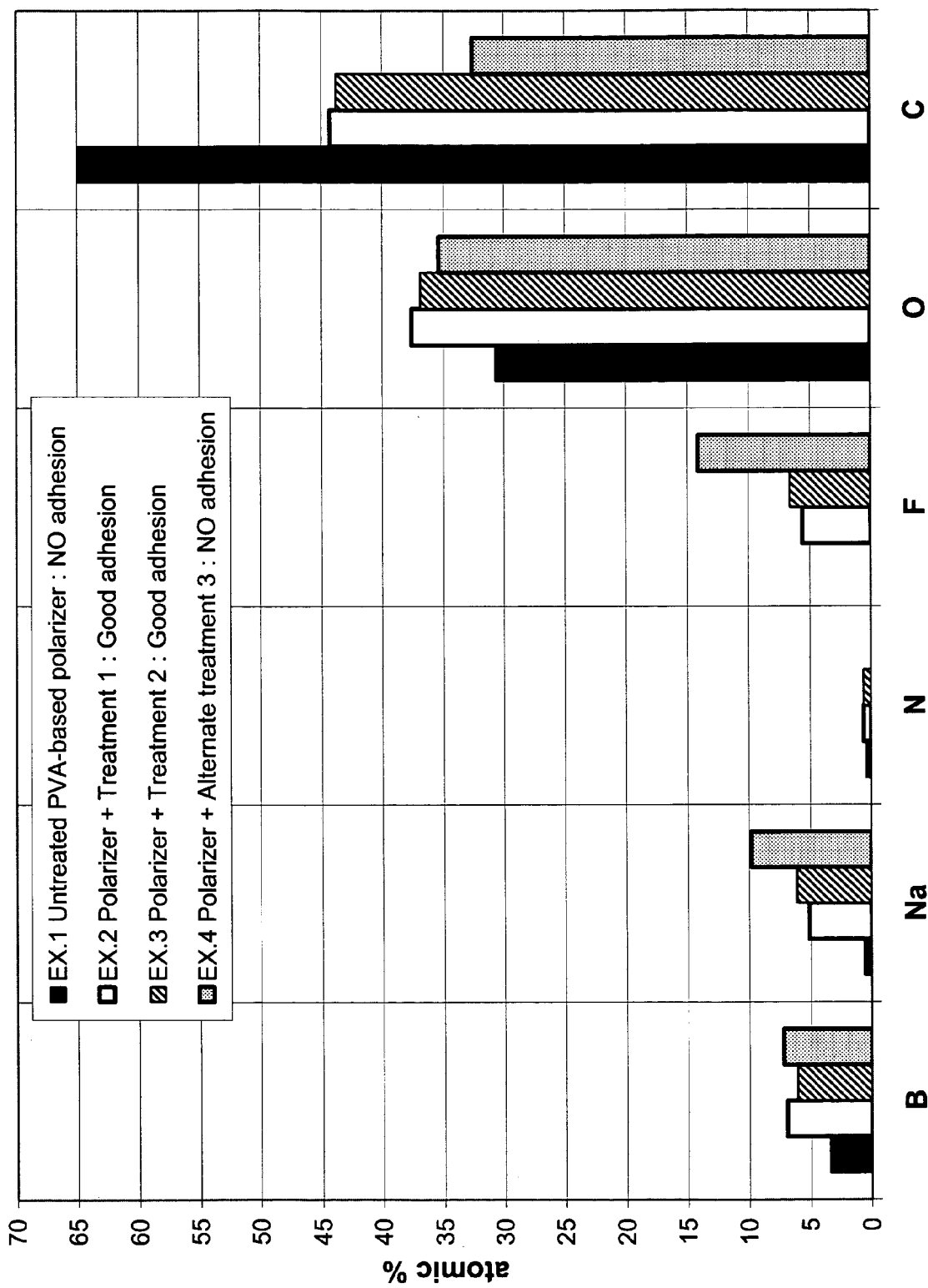
FIG. 1 is a graph of the relative atomic % concentration of species present on the surface of an untreated polyvinyl alcohol-based polarizer film, on the surface of such films altered according to the present invention in two exemplary treatments, and on the surface of a comparative example of such film altered by an alternate treatment that resulted in poor adhesion.

The present invention is embodied in a polyvinyl alcohol-based film (PVA film) that has been treated to alter its surface and thereby enhance its subsequent adhesion in optical constructs. Specifically, the film's surface chemistry and also its surface roughness are altered to achieve adequate adhesion directly between the modified PVA film and the optical materials of an optical construct. Good adhesion can be ensured without the need for additional coatings on the PVA film, or multilayer adhesively-bonded sandwich structures.

PVA films are often imbibed or treated to impart specific properties, such as polarization, photochromicity, or tint to the resultant film. Particularly for polarized films, the material often is uniaxially stretched to enhance the dichroic and polarizing properties of the film. However, this stretching process makes the film thinner and therefore more susceptible to damage, and it also can induce directional weakness within the film. The film may also be shaped or formed into curvatures complementary to lens shapes, for example, and treated with additional agents to stabilize the film's properties, such as polarization. These methods of film preparation are known to those of ordinary skill in the art and are disclosed, for example, in the patents identified above.

In the discussion of the present invention, the PVA film will be described as a polarized film, one of the preferred embodiments of the invention. However, those of ordinary skill in the art will recognize that the invention applies broadly to PVA-based films, including, for example, such alternate embodiments as photochromic or tinted films; films having other additives for tailoring physical properties, such as added small particles to alter color, refractive index, or optical clarity; and films having combinations of optical properties.

One challenge in creating an optical construct using a PVA-based film (for example, a polarizing film) is to ensure good adhesion between the film and the optical material, without jeopardizing the optical properties imparted by the film. This is a particular challenge in the preparation of a thermoset resin optical construct. First, the fragile film must be supported or suspended reliably while liquid-phase reactive material is placed around both sides of the film. Methods for controlling film placement and delivery of liquid-phase reactive material are outlined, for example, in U.S. Pat. No. 6,391,231 B1. These methods address one problem of manufacturing, but care still must be taken to ensure that the PVA-based film adheres dependably to the optical construct. Untreated PVA-based films generally do not bond to typical thermoset resin materials adequately to withstand even minimal pressure to separate the construct. In fact, for thermoset reinforced plastics fabrication, PVA actually is used as a mold release agent. Consequently, a functional optical construct cannot be produced without the need for additional adhesion-promoting processing. Moreover, the film's optical and adhesion properties must withstand the temperature excursions that occur during any exothermic reaction of the resin system, as well as any additional thermal, radiant energy, or chemical exposure during subsequent curing, coating, or other processing of the optical construct. Importantly, the heat and reaction of initial solidification must neither deform the film nor interfere with the bonding process between the treated film and the reactively forming solid resin structure.

The inventors sought alternate means to treat the film for improved adhesion. One technique investigated was reduced-pressure plasma processing, which is known and widely used in optical thin film and semiconductor preparation. This technique can be used to clean, modify, coat, or selectively etch materials. While this technique offers extremely broad capabilities, the processing parameters must be carefully controlled to ensure, for example, that a process optimized to clean a monolayer of organic residue off a fragile substrate does not drift into a process that etches a hole through the substrate. This requires significant scientific investigation of likely mechanisms and extensive experimentation with possible alternative reactions.

The inventors' investigation yielded a unique and surprising result. They found that modification of the PVA-based film by incorporation of fluorine species dramatically increased adhesion of the film in the optical construct. This was unexpected, because fluorine species typically are used in plasma processing to accomplish one of two goals, which both are distinctly different from the present result. In the first previously recognized plasma process, fluorine species etch or clean away residue on a surface. The goal of this known process is to yield a pristine substrate, not one that has been modified by fluorine addition. The other previously recognized plasma process is to fluorinate a surface such that it then is unreactive to any further bonding. Neither of these results occurred with the inventors' treatment of the PVA-based film, and, indeed, the incorporation of fluorine species in the film's surface structure was essential to improving subsequent bonding of the treated PVA-based film with thermoset materials.

FIG. 1 provides further details of this surface chemical modification. These are atomic % concentrations identified by X-ray photoelectron spectroscopy (XPS) of various PVA-based polarized film surfaces. Carbon and oxygen peaks are expected from the base PVA film. The presence of boron, sodium, and nitrogen in small amounts can be attributed to the chemicals used to create the polarization in the film. In addition, adventitious sodium and nitrogen can occur from handling and atmospheric exposure.

The data shows that the untreated film surface contains no fluorine, while those treated by treatments 1 and 2, which yielded acceptable adhesion, contain an appreciable amount of fluorine incorporated on the surface. The inventors also found that if the PVA-based film is altered excessively, as in alternative treatment 3, adhesion is reduced. The film subjected to alternative treatment 3 shows significantly more fluorine content (approximately 14%) than treatments 1 and 2.

In addition, the relative ratio of oxygen to carbon changes for a film with improved adhesion. In the untreated film, the oxygen:carbon ratio is approximately 0.5:1, whereas the films altered by treatments 1 and 2 had oxygen:carbon ratios in the range of 0.5:1 to 1:1, and the film that was altered by treatment 3 had an oxygen:carbon ratio greater than 1:1.

Figure 2:
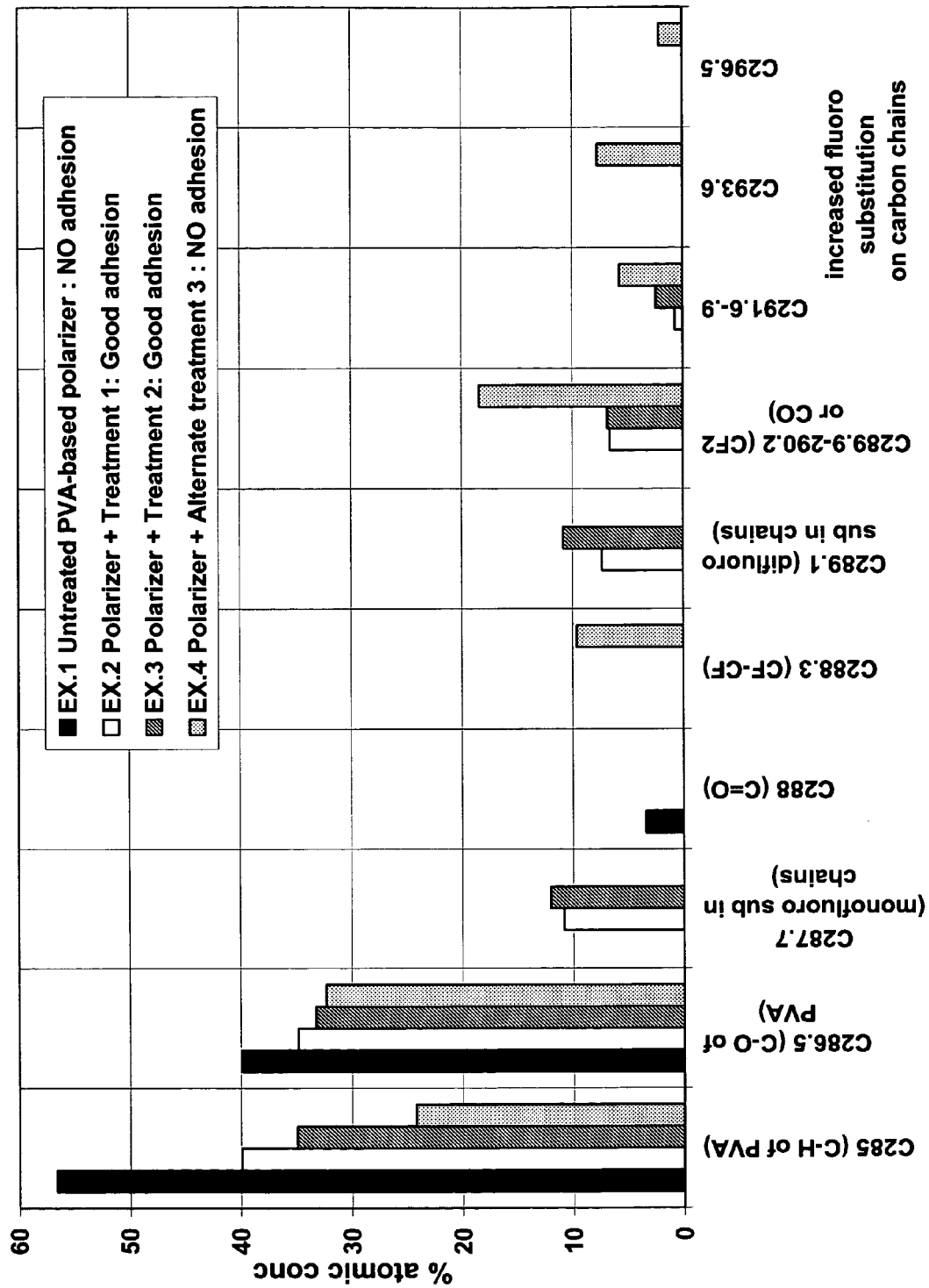
FIG. 2 is a graph of the relative % concentration of carbon in different bonding states on the surfaces of the untreated and the variously treated polyvinyl alcohol-based polarizer films represented in FIG. 1.

More detailed information about the chemical bonding changes associated with the present invention is presented in FIG. 2. This figure derives from deconvolution of the C1s region of the XPS spectra for the four film conditions discussed above in connection with FIG. 1. Deconvolution allows assignment of the specific carbon bonds present. In FIG. 2, atomic % concentrations, totaling to 100% of carbonaceous species, are given as a function of the XPS bond energies with known or most likely bond assignments.

A PVA film in its untreated state will naturally have a preponderance of C—H and C—O bonds. In fact, these films have been studied extensively enough that unequivocal assignments of C1s bond energies for these PVA species are found in compilations of XPS data. The C—H and C—O bonds of PVA at 285 and 286.5 eV are labeled accordingly. Some of the subsequent bond energies for C—O and C—F species overlap, and most probable species are indicated.

Complementary to the atomic % concentration analysis of FIG. 1, the untreated film shows the highest content of C—H bonds vs. C—O bonds, with decreasing C—H content for the variously treated films. A small amount of C=O bonding is present in the untreated film, also, but it is absent from any of the treated films. The bond near 290 eV may be indicative of either C—F or C—O bonds, both of which are increased for the films altered according to the present invention.

FIG. 2 shows that additional C—F bonding states appear on the treated film. In particular, in a preferred embodiment of the present invention, PVA films show incorporation of C—F or C—$F_2$ species adjacent to $(CH_x)_n$ groups on the surface of the film. In other words, extended perfluorinated chains are not indicated as a necessary condition for improved bonding, but individual substitutions of fluorine for hydrogen along the chain do increase subsequent adhesion. In contrast, alternate treatment 3, which yielded no adhesion, shows more extensive substitution of adjacent $CF_x$ species in the PVA film's polymer chain.

It also was observed that despite the fact that fluorine is demonstrably present on the modified film's surface, the contact angle of the film did not increase to the extent often observed for a fluorinated material. Typical water droplet contact angles on untreated PVA-based polarizer films range from about 40° to about 7°, and the angles decrease with higher moisture content in the film. On fluorinated surfaces, on the other hand, water droplet contact angles often are measured at 90° or greater, indicating a very hydrophobic surface. In contrast, films modified according to the present invention show contact angles of only about 3° to about 15°.

The chemical changes in the PVA-based film structure, described above, are one method of the present invention for improving adhesion. The inventors also have discovered another innovative method to achieve improved adhesion.

In a separate and independent feature of the invention, surface roughness was found to contribute to improved adhesion. Specifically, it was found that overall surface roughness, as measured by atomic force microscopy, increased from an rms value of about 9 nm for untreated PVA film to approximately 20 nm for films successfully treated according to treatments 1 and 2, and to approximately 30 nm for films unsuccessfully treated according to treatment 3. Consequently, it is concluded that surface roughness also can play a role in improved adhesion.

Furthermore, to achieve these changes for improved adhesion, the inventors have discovered a new technique for surface treatment. Reduced-pressure plasma systems are well known, and many different configurations are commercially available. A standard rf (radio frequency, typically 13.56 MHz) plasma chamber configuration includes a parallel plate reactor with a powered electrode and a grounded structure to define a primary plasma region. A typical processing method for treatment or coating of a substrate is to place the substrate on the powered electrode such that it will be in full contact with the primary plasma zone.

Interestingly, when the inventors placed a PVA film in this typical configuration, no adhesion improvement resulted. This was the configuration used for the alterative treatment 3 reflected in FIGS. 1 and 2. Instead, the inventors found an unexpected and unique arrangement for successful treatment according to the present invention. This exemplary method of treatment can be more clearly understood with reference to FIGS. 3 and 4.

Figure 3:
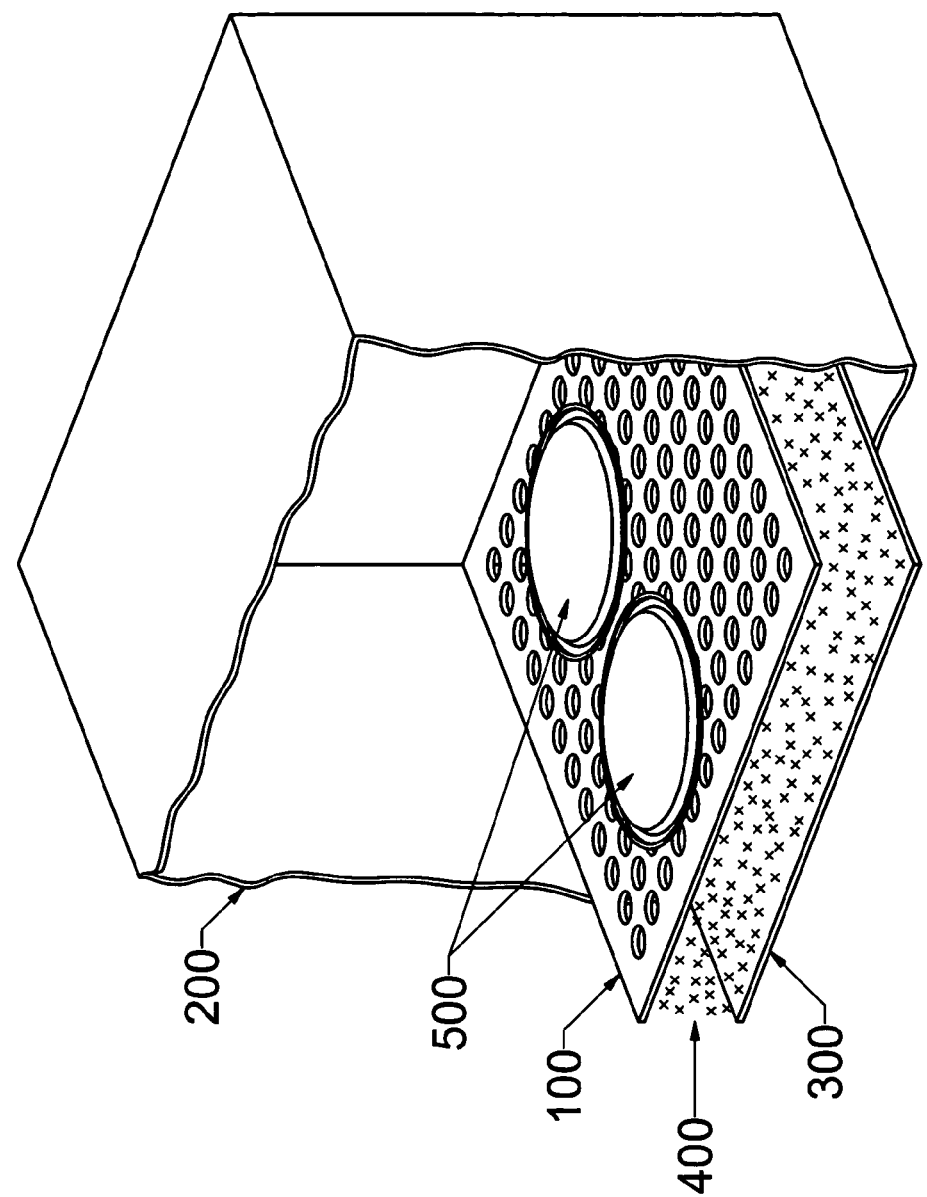
FIG. 3 is a schematic drawing of an exemplary configuration of a plasma chamber for treatment of the film to effect the surface changes of the invention.

As shown in FIG. 3, a perforated, powered rf electrode plate 100 is configured to allow gas circulation throughout a reduced pressure plasma chamber 200. The electrode plate is positioned near a grounded wall 300, such that when the electrode plate is powered, it establishes its normal primary plasma 400 in the small region between the electrode plate and the wall. The depicted parallel plate arrangement is somewhat atypical; because standard operation would place the ground near the top of chamber 200, so that the greatest portion of the chamber would contain and define a much larger plasma region for direct, energetic treatment of samples.

Pieces of PVA-based film 500 were placed on the opposite surface of the electrode plate 100, away from the primary plasma region created in this atypical arrangement. Thus, the film was positioned outside the primary plasma region, but accessible to effluent from the plasma via the perforations in the electrode plate. This allows ions, radicals, and other energetic species generated by the plasma to drift to the film and interact with its surface. Another important aspect of this configuration is that the film might also be contacted by weak plasma regions created within the perforations of the electrode or by weak localized concentrations of rf energy due to surface discontinuities on or near the electrode plate. The inventors refer to this atypical arrangement as "indirect, reduced-pressure plasma" processing.

Indirect, reduced-pressure plasma processing operates in the hundreds of milliTorr range, which equates to mean free pathlengths of much less than 1 mm. This is distinguishable from remote plasma electron cyclotron resonance (ecr) systems, which are characterized by significantly lower pressures. It differs also from standard remote plasma cleaning systems that allow no contact with the plasma zone, or with weak localized energy concentrations. In addition, remote plasma systems often use elevated temperatures to increase reactions, and such operation would destroy the PVA film.

The exemplary arrangement described by FIG. 3 has obvious limitations in the number of parts that could be placed on the electrode plate 100 for treatment. Another approach within the scope of the present invention is to use an in-line or load-locked system that allows the film to progress through the chamber sequentially for treatment.

Figure 4:
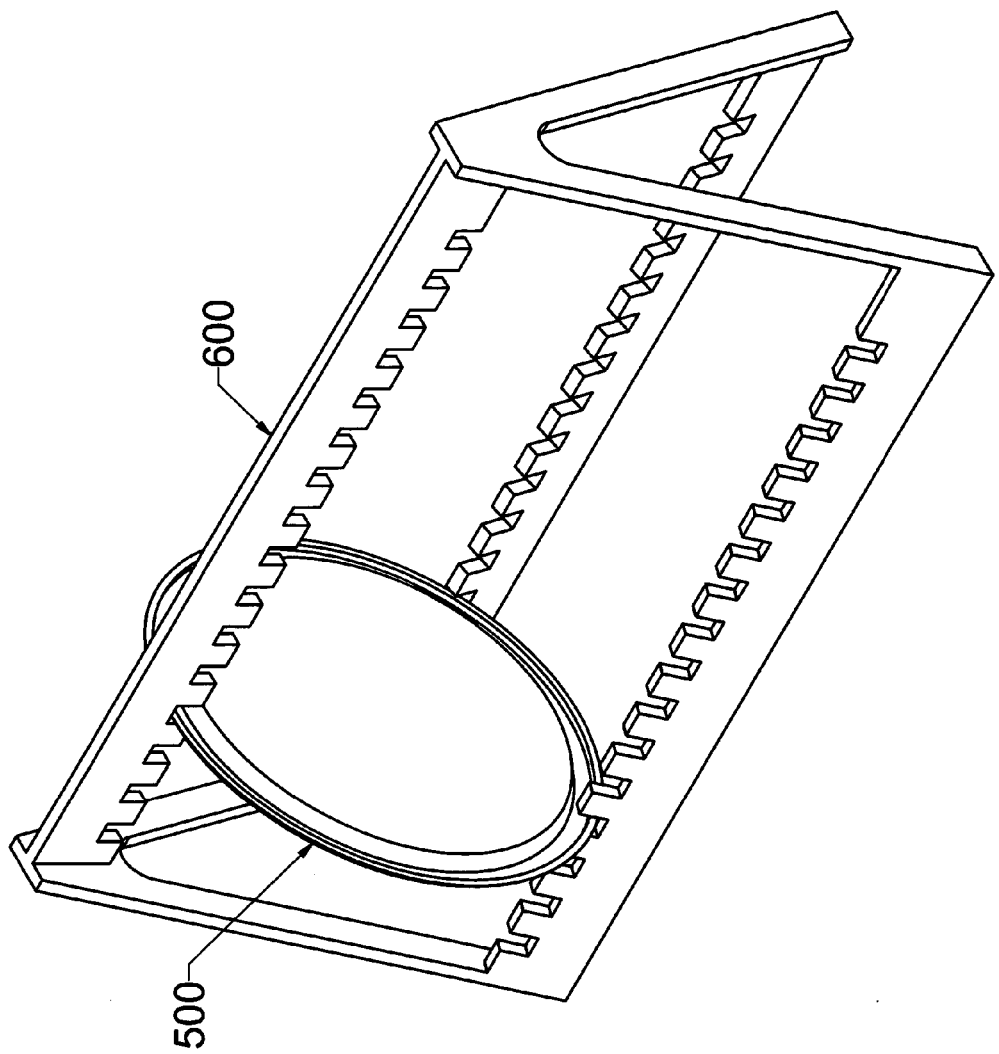
FIG. 4 is a schematic drawing of an exemplary film holder that can be used with the plasma chamber of FIG. 3 for treatment of the film to effect the surface changes of the invention.

In another preferred embodiment, the inventors found that a film holder with surface discontinuities can be placed in contact with the electrode and successfully employed to increase the number of film parts treated per cycle. FIG. 4 shows one exemplary embodiment of such a holder. Pieces of PVA-based polarizer film 500 are shown mounted on edge in a holder 600. Contrary to standard rf practices, which mandate rounding all edges and corners to minimize any antenna-like effects, the holder 600 is specifically designed to have sharp corners which can act as points for weak localized concentration of rf energy. The holder is preferably made of an electrically conductive material, such as aluminum or stainless steel, and it is positioned on the electrode plate 100 to allow at least some electrical continuity between the plate and the holder.

The invention now will be described in more specific detail with reference to the following non-limiting examples. Note that the modifications of film described by Examples 1–4 below constitute the treatments analyzed in FIGS. 1 and 2.

Commercially available, spherically curved pieces of PVA-based polarizer film designed for incorporation into ophthalmic lens blanks were obtained and subjected to the treatment described in the following Examples. In these Examples, the film was treated in a commercially available rf parallel plate plasma chamber obtained from TePla America, Inc. (Corona, Calif., USA), with the film positioned as described in each example.

In all of the Examples, the exemplary plasma process conditions for treatment were:

Step 1: oxygen gas at 900 mT pressure, 10-minute treatment at 100 W

Step 2: 8.3:1.1:1 flow ratio of $O_2$:Ar:$CF_4$, at 450 mT pressure, 7-minute treatment at 150 W.

The film was then positioned in a thermoset mold assembly, and liquid-phase, standard hard resin material was introduced, to encapsulate the film such that the polarizer was positioned approximately 1 mm from the front surface of the lens blank and about 2–9 mm from the back surface, depending on the lens design. The lens assembly was cured according to standard hard resin procedures and demolded.

To evaluate the adhesion of the polarizer within the lens, the lens blank was cribbed (reduced in diameter) from approximately 76 mm to a 70 mm round, then surfaced from the back side to a final total thickness of approximately 2 mm. This operation is similar to prescription eyeglass lens preparation and, therefore, is a good initial test of performance. It is expected that no delamination will occur between the polarizer and either the front surface or the back surface of the lens during this procedure.

To further test adhesion, the surfaced lens then was broken into multiple pieces, and the break pattern analyzed. If either the front or back resin surface separated cleanly from the embedded polarizer film, it was judged an adhesion failure (marked as Fail in the Examples to follow). If a broken edge could be subjected to pressure to cause it to separate further into the piece, it also was judged a failure. If a clean break occurred and no separation could propagate from the broken edge, the lens was judged to have acceptable adhesion (marked as Pass in the Examples below).

COMPARATIVE EXAMPLE 1

To establish a baseline of expected behavior, PVA-based film was assembled as received, with no treatment to enhance adhesion.

EXAMPLE 2

PVA film was mounted edge-wise in a holder as shown in FIG. 4 and placed on the rf electrode plate. The rf plasma was ignited such that the primary plasma was contained as shown in FIG. 3, against the wall of the chamber. This film, thus, was treated by indirect, reduced-pressure plasma processing beyond the primary plasma region.

The film was treated with the plasma process conditions of Step 1 and Step 2.

EXAMPLE 3

PVA film was placed flat on the electrode plate, as shown in FIG. 3. The rf plasma was ignited such that the primary plasma was contained as shown in FIG. 3, against the wall of the chamber. This film, thus, was treated by indirect, reduced-pressure plasma processing beyond the primary plasma region.

The film was treated with the plasma process conditions of Step 1 and Step 2.

COMPARATIVE EXAMPLE 4

To compare the effects of direct plasma exposure to the results of the present invention, PVA film was placed flat on the electrode plate. The plasma chamber of FIG. 3 was re-configured such that the primary plasma occurred above the electrode and in direct contact with the PVA film.

The film was treated with the plasma process conditions of Step 1 and Step 2.

COMPARATIVE EXAMPLE 5

To determine the effects of the film holder configuration, PVA film was placed edge-wise in an alternate holder on the electrode. This holder was electrically conductive and in contact with the electrode, but designed to have only rounded edges. No top edge support was present; instead, the film was cradled in a rounded metal frame that extended approximately halfway up the edge of the film rounds.

The rf plasma was ignited such that the primary plasma was contained as shown in FIG. 3, against the wall of the chamber. This film, thus, was treated by indirect, reduced-pressure plasma processing beyond the primary plasma region.

The film was treated with the plasma process conditions of Step 1 and Step 2.

COMPARATIVE EXAMPLE 6

To confirm the importance of fluorine in the surface modification of the present invention, PVA film was mounted edge-wise in a holder as shown in FIG. 4, and placed on the rf electrode. The rf plasma was ignited such that the primary plasma was contained as shown in FIG. 3, against the wall of the chamber. This film, thus, was treated by indirect, reduced-pressure plasma processing beyond the primary plasma region.

The film was treated only with the plasma process conditions of Step 1.

The experimental variables and the molded lens results are summarized in Table 1.

TABLE 1

Experimental Conditions and Adhesion Results

| Ex # | Plasma Zone | Film Position | Process Steps | Adhesion |
|---|---|---|---|---|
| 1 | none | none | none | Fail |
| 2 | indirect | FIG. 4 holder | 1&2 | Pass |
| 3 | indirect | flat | 1&2 | Pass |
| 4 | direct | flat | 1&2 | Fail |
| 5 | indirect | Rounded, cradle holder | 1&2 | Fail |
| 6 | indirect | FIG. 4 holder | 1 | Fail |

The Examples clearly show that the inventors have found a unique and successful method to modify a PVA-based film for improved adhesion. Example 6 confirms the importance of the fluorine addition; typical oxygen plasma cleaning is not sufficient. Example 5 confirms the inventors' unexpected finding that the non-standard holder configuration with pointed edges is beneficial to achieve the desired result. Examples 2, 3, and 4, together, confirm that non-standard, indirect, reduced-pressure plasma processing is a successful method to achieve the improved adhesion.

Example 4 suggests that standard rf plasma processing conditions is too severe for the desired surface modification. However, it might be possible to further modify or temper standard rf processing conditions to achieve the desired end. Similarly, other plasma sources than rf energy could be effective, including microwave, dc, pulsed sources, and the like, or combination of energy sources such as microwave and rf energies. Again, it is likely that with control and optimization of the process conditions, it might be possible to achieve the desired surface modifications by various methods. It might even be possible to achieve the desired surface modifications using atmospheric pressure plasmas.

In fact, the inventors have noted that even with the indirect, reduced-pressure plasma processing, certain combinations of process parameters yield better adhesion results than do others. For instance, the approximately 8:1 ratio of $O_2:CF_4$ flow detailed in the Examples is one set of process conditions that yields good adhesion. Maintaining this flow ratio and increasing the rf power to 180 Watts yielded reliable adhesion, as well. Then, with similar rf powers and pressure settings, the inventors found that an 11:1 flow ratio also yielded a beneficial result. One skilled in the art will recognize that other combinations of process parameters can be balanced in various manners within the scope of the invention, to achieve successful modification of the surface.

As indicated in FIGS. 1 and 2, and confirmed by the above test results, fluorine is an important modifier to achieve the improved adhesion. Interestingly, the inventors found that exposure to the mixed gas plasma of $O_2:Ar:CF_4$ was more successful than just exposure to $CF_4$. This might indicate that some competing or combination pathways of oxygen and fluorine substitution occur together to create the surface modifications needed for enhanced adhesion. Optimization experiments show the adhesion was much less influenced by the argon content, consistent with its common use as an rf plasma stabilizing gas.

These Examples have detailed results for PVA-based films providing polarization. It is expected that similar results would be obtained for PVA films having other optical properties, as well.

EXAMPLE 7

A PVA-based film is prepared with added dyes that impart visible color to the film, but that do not create a polarized film. The tinted film is subjected to indirect, reduced-pressure plasma processing as described in Example 2, above. It is expected that fluorine would be detectable on the surface of the treated film. It also is expected that adhesion similar to that of Example 2 obtains when the film is cast in a thermoset resin system. Alternative dyes, if they can be absorbed or imbibed into the PVA-based film, should provide a similar result to polarizers incorporated into or onto the film.

EXAMPLE 8

A PVA-based film is prepared with added photochromic dyes. The film with added photochromic dyes is subjected to indirect, reduced-pressure plasma processing as described in Example 2, above. It is expected that fluorine would be detectable on the surface of the treated film. It also is expected that adhesion similar to that of Example 2 obtains when the film is cast in a thermoset resin system. It is possible that the indirect, reduced-pressure plasma processing may be particularly suitable for photochromic PVA-based film treatment. This innovative indirect process will subject the film to much less UV exposure than does a typical plasma process, thus limiting any photobleaching effect that could diminish the photochromic performance.

Accordingly, a chemically modified PVA-based film is obtained with improved adhesion to optical constructs. Specifically, no additional coatings, supporting polymer layers, or adhesively bonded, multilayer sandwich systems are needed to ensure good adhesion to optical resin materials, even when the PVA-based film is subjected to the reactive conditions of thermoset solidification. A preferred method for achieving this end, and alternate film holders that can be used in connection with the method, also are described While preferred embodiments are disclosed herein, many variations are possible which remain within the concept and scope of the invention. Such variations would become clear to one of ordinary skill in the art after inspection of the specification. The invention therefore is not to be restricted except within the spirit and scope of the appended claims.

The invention claimed is:

1. A polyvinyl alcohol-based film comprising:
   a polarizer; and
   fluorine on a surface of the film.

2. A polyvinyl alcohol-based film as defined in claim 1, wherein the fluorine content is less than about 14 atomic % concentration.

3. A polyvinyl alcohol-based film as defined in claim 1, wherein the fluorine is bonded as C—F species on the surface of the film.

4. A polyvinyl alcohol-based film as defined in claim 3, wherein the C—F species are bonded adjacent to non-fluorinated species.

5. A polyvinyl alcohol-based film-as defined in claim 1, wherein the oxygen-to-carbon ratio on the surface of the film is greater than approximately 0.5:1.

6. A polyvinyl alcohol-based film as defined in claim 5, wherein the oxygen-to-carbon ratio on the surface of the film is not greater than approximately 1:1.

7. A polyvinyl alcohol-based film comprising:
   fluorine on a surface of the film;
   wherein the oxygen-to-carbon ratio on the surface of the film is greater than approximately 0.5:1.

8. A polyvinyl alcohol-based film as defined in claim 7, wherein the oxygen-to-carbon ratio on the surface of the film is not greater than approximately 1:1.

9. A polyvinyl alcohol-based film as defined in claim 8, wherein the film comprises a polarizer.

10. A polyvinyl alcohol-based film as defined in claim 7, wherein the fluorine content is less than about 14 atomic % concentration.

11. A polyvinyl alcohol-based film as defined in claim 10, wherein the oxygen-to-carbon ratio on the surface of the film is not greater than approximately 1:1.

12. A polyvinyl alcohol-based film as defined in claim 7, wherein the fluorine is bonded as C—F species on the surface of the film.

13. A polyvinyl alcohol-based film as defined in claim 12, wherein the C—F species are bonded adjacent to non-fluorinated species.

14. A polyvinyl alcohol-based film as defined in claim 7, wherein the film comprises a polarizer.

* * * * *